United States Patent [19]

Johnson

[11] Patent Number: 4,982,627
[45] Date of Patent: Jan. 8, 1991

[54] COLOR CODED TOOLS
[76] Inventor: Ken A. Johnson, 6574 NW. Third St., Margate, Fla. 33063
[21] Appl. No.: 810,223
[22] Filed: Dec. 18, 1985
[51] Int. Cl.⁵ .............................................. B25B 13/06
[52] U.S. Cl. ............................. 81/121.1; 81/DIG. 5; 81/177.1
[58] Field of Search ...................... 81/121.1, 122–123, 81/DIG. 5, 177.1, 177.85, 180.1, 184, 185, 900

[56] References Cited
FOREIGN PATENT DOCUMENTS
2424585 12/1975 Fed. Rep. of Germany. 81/DIGS. 5

OTHER PUBLICATIONS
*Resistance and Resistors*, Wellard, McGraw-Hill Book Company, pp. 63–64, 1960.

*Jensen Tools and Alloys*, Fall catalog, 1977, Hollow-Shaft Nut Drivers.

Primary Examiner—D. S. Meislin
Attorney, Agent, or Firm—Robert J. Van Der Wall

[57] ABSTRACT

The present invention provides a color code tool identification method for the instant determination of the size of various types of hand tools and small cutting tools such as drill bits.

A color chart is provided showing a range of ten colors. Each color indicates a particular numeral. The sequence of the indicated numerals providing a size designation for the tool. The method provides fractional inch size determination and also metric size determination. The method may be used alone or in conjunction with conventional marking methods.

32 Claims, 2 Drawing Sheets

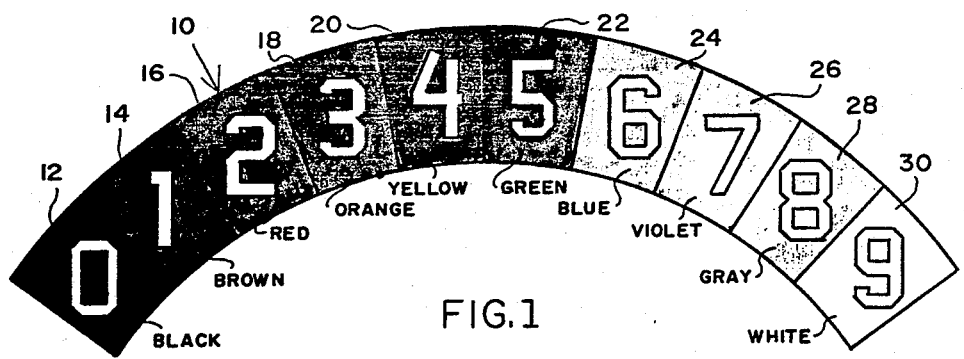
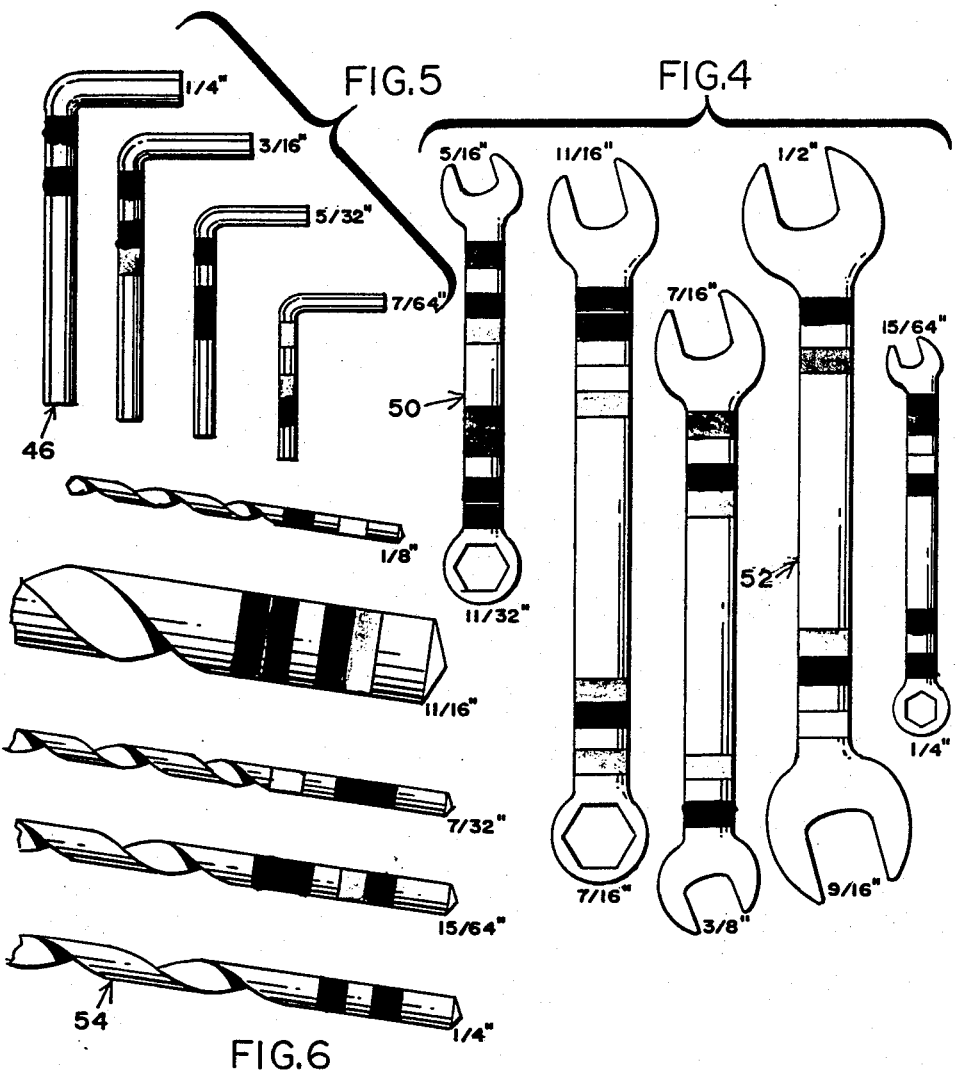

COLOR CODED TOOLS

FIELD OF THE INVENTION

The present invention relates to the field of identifying size markings and in particular to the color code marking or various hand tools and cutting tools.

BACKGROUND OF THE INVENTION

The present invention relates to the identification of various tools such as socket wrenches, end wrenches, box wrenches and "Allen" wrenches as well as various cutting tools such as drill bits.

The usual and customary manner of marking such tools consists of imprinting the identifying characters on the surface of the tool or by stamping a heavy imprintation of the identifying markings into the surface so as to provide a permanent marking for permanent identification.

Although the usual and customary method set forth above has been employed in industry for many years, certain problems persist and interfere with optimum results. For example, the fractional size markings on a socket, in normal use, becomes covered with grease at the same location where the marking was placed. The user must now stop working and wipe away the grease and read the marking to determine the size of the socket. The same problem arises in the use of all other types of wrenches as well. Some open end wrenches are marked only on one side making it necessary for a user to flip the wrench over to find the size markings or to turn the wrench around in such a manner that will bring the markings to a proper upright position so that the markings are readily legible.

A similar problem arises with the use of drill bits. The size markings of drill bits are usually marked on the lower shank of the drill bit. The drill bit is held by a chuck having gripping jaws. It is very common for the drill bit to become stuck in the material being drilled and for the chuck jaws to continue turning while gripping the surface of the drill bit shank with the consequence that the size markings are removed from the shank of the drill bit.

The present invention provides a means to reduce or eliminate these common problems. The present invention uses a novel method of tool identification by using a color coded series of grooves that allow an instant identification of tool size. The grooves extend completely around the circumference of the tool and reduce substantially the likelihood that the colors will be completely obscured by dirt or grease. The grooves are cut deep enough in the surface of the tool and the color material is set deep enough within the grooves, to prevent contact with other objects of the color material and avoid the wearing away or chipping of the color 1 material. In this manner, the color coding becomes a permanent part of the tool.

The comparatively deep recessing of the color material also reduces the possibility of obliteration by the slipping of chuck jaws and thereby provides a relatively permanent identification marking of the drill bit.

The present invention provides a range of ten colors. The colors are actually equivalents for all ten integers from which all numbers and even fractions are composed. They are thus used to indicate fractional inch sizes and also metric sizes, when utilized in combination with easy-to-understand spacing and band width configurations.

Although the use of color coding has been used and well known in the electronic industry for the coding of electrical resistors and capacitors, and also in the manufacture of color coded shotgun shells, the use of the system provided by the present invention represents a novel departure from the prior art in the field of common hand tools and drill bits.

The usefulness and novelty of the present invention will become even more apparent in the text of the detailed description that follows.

SUMMARY OF THE INVENTION

In the normal course of work done by mechanics and other tradesmen many expensive man hours are lost because of problems and impediments occuring in the work environment. Much time is lost by the workers not being able to identify tool sizes due to accidental obliteration of size markings on tools, as by the temporary concealment of such markings by the collection of grease or other soiling on the marked surface of the tools.

Accordingly, it is a primary obJect of the present invention to provide a more advantageous method of tool size identification and thereby create more pleasant working conditions for labor as well as to reduce labor costs in terms of wasted man hours.

It is a further object of the present invention to provide a color marking method the is recessed below the surface of hand tools so as to avoid the obliteration of such markings during normal use.

It is a still further object of the present invention to provide a recessed color code marking system that extends completely around the circumference of tool surfaces so as to be visible from most any angle and from all sides.

It is an important object of the present invention to provide a color coded identification system that is recessed to allow for the use of various color materials such as paint, plastic or fused ceramic materials.

It is a further important obJect of the present invention to provide a highly visible color code chart which may be placed on the underside of the top lid of an ordinary tool box.

It is a still further obJect of the present invention to provide a method of tool identification that will make unnecessary the handling and positioning normally done, to discover and decipher the usual tool markings.

DESCRIPTION OF THE DRAWINGS

The file of this patent contains at least one drawing executed in color. Copies of this patent with color drawings will be provided by the Patent and Trademark Office upon request and payment of the necessary fee.

The file of this patent contains at least one drawing executed in color. Copies of this patent with color drawings will be provided by the Patent and Trademark Office upon request and payment of the necessary fee.

FIG. 1 illustrates a series of identification colors corresponding to all ten integers or numerals.

FIG. 4 illustrates a set of hand wrenches, each having color coded identification markings thereon.

FIG. 5 illustrates a set of hexagonal wrenches, each having color coded identification markings thereon.

FIG. 6 illustrates a set of drill bits, each having color coded identification markings thereon.

DETAILED DESCRIPTION

Figure 2:
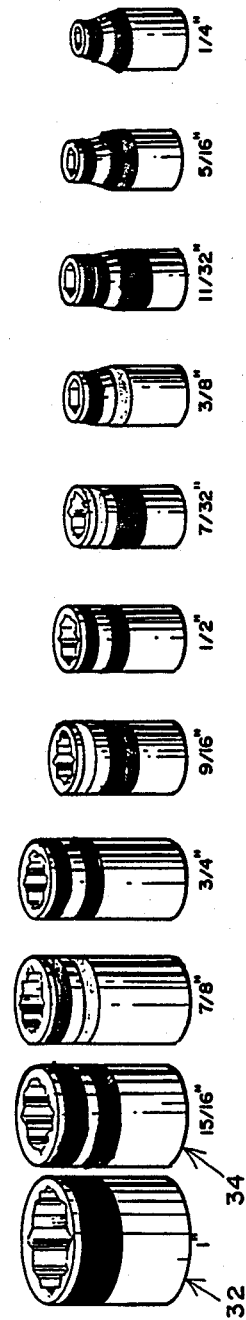
FIG. 2 illustrates a set of sockets each having a color coded identification marking thereon.

Referring to the drawings by characters of reference, FIG. 1 illustrates a color code chart 10. The black color 12 represents the integer or numeral 0. The brown color 14, represents the numeral 1. The red color 16, represents the numeral 2. The orange color 18, represents the numeral 3. The yellow color 20, represents the numeral 4. The green color 22, represents the numeral 5. The blue color 24, represents the numeral 6. The violet color 26, represents the numeral 7. The gray color 28, represents the numeral 8 and the white color 30, represents the numeral 9. This chart 10 would typically be attached to the tool box for ready reference.

FIG. 2 illustrates a set of fractional inch size sockets. Before considering the specific embodiments of the invention illustrated, it is important to understand how the color coded rings are arranged with predetermined spacing and band width configurations so that the same are read consistently and can be used to distinguish between English and metric sizes, and can be used to define fractional numbers, since tools with English sizes are conventionally expressed in fractions. The predetermined configuration rules are as follows:

1. Read the tool from the end toward its center.
2. Blank spacing between color coded rings indicates the dividing line of a fraction between its numerator and its denominator.
3. Narrow rings are for English (inch) sizes, wider rings for metric, except an extremely wide single color can be used for a whole integer inch size. Now turning back to FIG. 2, it will be seen that using the color code as shown in FIG. 1, the socket 32 with the brown ring 14 marked thereon, is indicated to be for 1 inch bolts. The socket 34 having a brown ring 14 to indicate the numeral 1 followed by green ring 22 indicating the numeral 5, a blank separation, and then brown ring 14 indicating the numeral 1 followed by blue ring 24 indicating the numeral 6, we arrive at a sequential number of 15 16 or the fraction 15/16.

Figure 3:
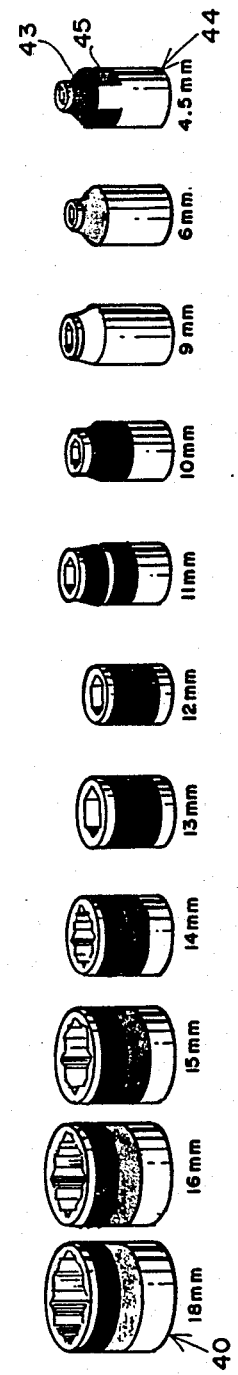
FIG. 3 illustrates a set of sockets of metric sizes, each of which has a color coded identification marking.

The same color code system is used to identify metric sizes and turning now to FIG. 3, the socket 40 is provided with the wider brown ring 14 indicating the numeral 1 and a wider gray ring 28 indicating the numeral 8 which together define the numeral 18 or 18 mm size. Since metric sizes are never stated in fractions, no parallel blank separations appear with the wider rings, but in rare instances, a decimal millimeter size might be created. If so, the invention contemplates the same by an interrupted color ring for numerals after the decimal point. Thus, socket 44 has a wider yellow ring 43 atop interrupted wider green ring 45. Yellow ring 43 indicates the numeral 4, while green ring 45 indicates the numeral 5, but because it is interrupted, the numeral 5 appears after the decimal point, making socket 44 with wider rings a metric size of 4.5 mm.

FIG. 4 illustrates a set of combination end wrenches. The wrench 50, having at the open end of the green ring 22 indicating 5, a blank space followed by the brown ring 14, indicating the numeral 1 and the blue ring 24 indicating the numeral 6, indicates a size of 5/16. Recall that reading of color codes is done from the end toward the center and so the closed end of wrench with two brown rings 14 indicating the numeral 11, a blank space, an orange ring 18 indicating the numeral 3 and a red ring indicating the numeral 2 provides an identification of 11/32 for the closed end of wrench 50. Wrench 52, at the upper end, having a brown ring 14, indicating the numeral 1, a blank space followed by a red ring 16, indicating the numeral 2, is identified as being of size ½ inch.

Turning now to FIG. 5, a set of hexagon wrenches is shown. The hexagon wrench 46 is shown to have a brown ring 14 indicating the numeral 1, a parallel blank space and a yellow ring 20, indicating the numeral 4 and thereby indicating the fractionated numers 1 and 4, or ¼ inch.

FIG. 6 illustrates a set of drill bits having color code means for size identification. The drill bit 54, reading from the spiral fluted end toward the shank end, shows a brown ring indicating the numeral 1, a blank space followed by the yellow ring 20 indicating the numeral 4, and thereby indicating the fractionated numers 1 and 4 or ¼ inch size.

Having described the presently preferred embodiments of the invention, it should be understood that various changes in construction and arrangement will be apparent to those skilled in the art and are fully contemplated herein without departing from the true spirit of the invention. In particular, it should be understood that different colors could be assigned to the various numerals, and different size, spacing, and reading conventions could be readily established.

What is claimed is:

1. A color coded tool size identification system comprising:
   at least one groove formed on the surface of a tool, each said groove being of a predetermined configuration of width to distinguish English from metric sizes;
   a colored material disposed within the groove to form a color ring, said colored material recessed beneath the tool surface and indicating a size numeral;
   a chart defining all ten arabic numerals as indicated by various colors, resulting in infinite size combinations by using as many grooves and colors disposed therein as necessary to define any size; and
   particular spacing to define a dividing line between a numerator and denominator of a fraction.

2. The system of claim 1 wherein the colored material indicating the numerals is disposed in sequence such as from an end of the tool to its center.

3. The system of claim 1 wherein the colored material is a paint.

4. The system of claim 1 wherein the colored material is a plastic

5. The system of claim 1 wherein the colored material is a fusible ceramic.

6. The system of claim 1 wherein the color black indicates the numeral 0.

7. The system of claim 1 wherein the color brown indicates the numeral 1.

8. The system of claim 1 wherein the color red indicates the numeral 2.

9. The system of claim 1 wherein the color orange indicates the numeral 3.

10. The system of claim 1 wherein the color yellow indicates the numeral 4.

11. The system of claim 1 wherein the color green indicates the numeral 5.

12. The system of claim 1 wherein the color blue indicates the numeral 6.

13. The system of claim 1 wherein the color violet indicates the numeral 7.

14. The system of claim 1 wherein the color gray indicates the numeral 8.

15. Apparatus as set forth in claim 1 wherein the color white indicates the numeral 9.

16. Apparatus as set forth in claim 1 wherein the groove extends completely around the circumference of a tool.

17. A color coded tool size identification comprising:
at least one groove formed on a surface of a tool, each said groove being of a predetermined configuration of width to distinguish English from metric sizes;
a colored material disposed within the groove to form a color ring, said colored material recessed beneath the tool surface and indicating a size numeral;
a chart defining all ten arabic numerals as indicated by various colors, resulting in infinite size combinations by using as many grooves and colors disposed therein as necessary to define any size; and
showing numerals after a decimal by an interrupted color ring.

18. The system of claim 17 wherein the colored material indicating the numerals is disposed in sequence such as from an end of the tool to its center.

19. The system of claim 17 wherein the colored material is a paint.

20. The system of claim 17 wherein the colored material is a plastic.

21. The system of claim 17 wherein the colored material is a fusible ceramic.

22. The system of claim 17 wherein the color black indicates the numeral 0.

23. The system of claim 17 wherein the color brown indicated the numeral 1.

24. The system of claim 17 wherein the color red indicates the numeral 2.

25. The system of claim 17 wherein the color orange indicates the numeral 3.

26. The system of claim 17 wherein the color yellow indicates the numeral 4.

27. The system of claim 17 wherein the color green indicates the numeral 5.

28. The system of claim 17 wherein the color blue indicates the numeral 6.

29. The system of claim 17 wherein the color violet indicates the numeral 7.

30. The system of claim 17 wherein the color grey indicates the numeral 8.

31. Apparatus as set forth in claim 17 wherein the color white indicates the numeral 9.

32. Apparatus as set forth in claim 17 wherein the groove extends completely around the circumference of a tool.

* * * * *